(12) United States Patent
Kennedy

(10) Patent No.: US 7,451,962 B1
(45) Date of Patent: Nov. 18, 2008

(54) ANCHORING TURNBUCKLE EXPANDER AND CONTRACTOR

(76) Inventor: Keith Kennedy, 174 Monroe Lake, East Stroudsburg, PA (US) 18302

(*) Notice: Subject to any disclaimer, the term of this patent is extended or adjusted under 35 U.S.C. 154(b) by 0 days.

(21) Appl. No.: 11/940,897

(22) Filed: Nov. 15, 2007

(51) Int. Cl.
*B21F 9/00* (2006.01)

(52) U.S. Cl. .................. 254/233; 254/231; 254/234; 254/237

(58) Field of Classification Search ............... 254/231, 254/233, 234, 235, 237
See application file for complete search history.

(56) References Cited

U.S. PATENT DOCUMENTS

| 310,767 | A | | 1/1885 | Wilson | |
|---|---|---|---|---|---|
| 1,037,615 | A | | 9/1912 | Grenier | |
| 2,673,632 | A | | 3/1954 | Stiranka | |
| 3,338,359 | A | | 8/1967 | Baillie et al. | |
| 3,785,324 | A | * | 1/1974 | Guthans | ............ 254/98 |
| 3,960,359 | A | * | 6/1976 | Svahn et al. | ............ 254/231 |
| 4,069,902 | A | | 1/1978 | Zdeb | |
| 4,100,875 | A | * | 7/1978 | Patterson et al. | ............ 114/251 |
| 4,130,269 | A | | 12/1978 | Schreyer | |
| 4,296,626 | A | * | 10/1981 | Jarman et al. | ............ 72/392 |
| 4,438,612 | A | | 3/1984 | Bernard et al. | |
| 4,785,614 | A | * | 11/1988 | Schoenherr | ............ 56/365 |
| 5,611,521 | A | * | 3/1997 | Grover et al. | ............ 254/235 |
| 5,911,409 | A | * | 6/1999 | Grover | ............ 254/235 |
| 6,945,516 | B1 | | 9/2005 | Scott et al. | |
| 7,097,154 | B2 | * | 8/2006 | Stevens | ............ 254/233 |

FOREIGN PATENT DOCUMENTS

| EP | 1435310 | 7/2004 |
|---|---|---|
| JP | 59187138 | 10/1984 |
| JP | 2271102 | 11/1990 |
| JP | 5318330 | 12/1993 |

* cited by examiner

*Primary Examiner*—Emmanuel M Marcelo
(74) *Attorney, Agent, or Firm*—Michael I Kroll

(57) ABSTRACT

A turnbuckle having pivoting releasable anchors on opposing ends that when attached to different articles provides for moving one or both of the attached article toward or away from the other. The turnbuckle anchors comprise a plate incorporating housing for releasably receiving a turnbuckle eyelet and a blade extending from the base having a substantially triangular shape.

13 Claims, 14 Drawing Sheets

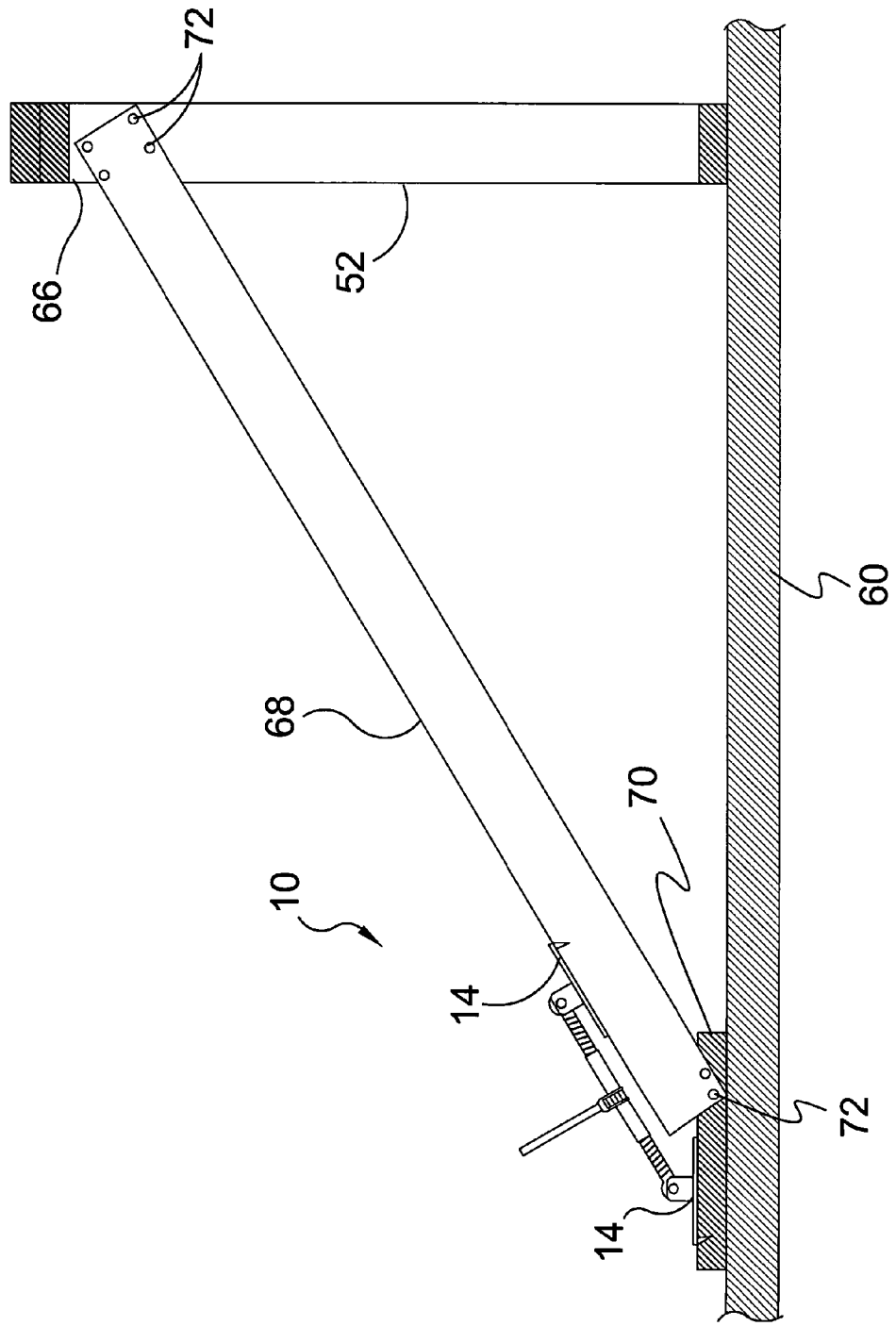

ANCHORING TURNBUCKLE EXPANDER AND CONTRACTOR

BACKGROUND OF THE INVENTION

1. Field of the Invention

The present invention relates generally to tools and, more specifically, to a turnbuckle having pivoting releasable anchors on opposing ends of the turnbuckle portion so that when the anchorable members are attached to different workpieces the instant invention provides for moving one or both of the attached workpieces toward or away from the other.

The turnbuckle anchors are comprised of a plate-like housing with structure for releasably receiving a turnbuckle eyelet and a blade having a substantially triangular shape extending from the housing opposing surface. The blade when driven into an article forms an anchor with the other blade driven into or abutting another article whereby the relative distance between the articles can be increased or decreased as desired.

The anchor plates are repositionable so that the blades having a somewhat flat edge can be respectively faced toward or away from the other and flipped whereby one blade is facing up while the other faces down.

2. Description of the Prior Art

There are other turnbuckle devices designed for workpieces. Typical of these is U.S. Pat. No. 310,767 issued to Wilson on Jan. 13, 1885.

Another patent was issued to Grenier on Grenier as U.S. Pat. No. 1,037,615. Yet another U.S. Pat. No. 2,673,632 was issued to Stiranka on Mar. 30, 1954 and still yet another was issued on Aug. 29, 1967 to Baillie et al as U.S. Pat. No. 3,338,359.

Another patent was issued to Zdeb on Jan. 24, 1978 as U.S. Pat. No. 4,069,902. Yet another U.S. Pat. No. 4,130,269 was issued to Schreyer on Dec. 19, 1978. Another was issued to Bernard et al. on Mar. 27, 1984 as U.S. Pat. No. 4,438,612 and still yet another was issued on Sep. 20, 2005 to Scott et al as U.S. Pat. No. 6,945,516.

Another patent was issued to Takaguchi on Oct. 24, 1984 as Japan Patent No. JP59187138. Yet another Japan Patent No. JP2271102 was issued to Hayama on Nov. 6, 1990. Another was issued to Omi et al. on Dec. 3, 1993 as U.S. Patent No. JP5318330 and still yet another was issued on Jul. 7, 2004 to Freigeber as European Patent Application No. EP1435310.

U.S. Pat. No. 310,767

Inventor: John B. Wilson

Issued: Jan. 13, 1885

A stump-puller consisting of a frame having right and left hand screws fitted to the ends thereof, suitable chain-connections between said screw ends and the load to be pulled, and pawl-and-ratchet mechanism connected to the said frame and adapted to be operated to draw on the load, substantially as described.

U.S. Pat. No. 1,037,615

Inventor: Cyprien Grenier

Issued: Sep. 3, 1912

An implement of the class described including a rotary sleeve having right and left hand screw threads, slidable rods provided with right and left hand threaded portions engaging the threads of the sleeve, ratchet mechanism for rotating the sleeve, and a support having bearings for the rotary sleeve and provided with guiding means having a slidable connection with the rods or holding the same against rotary movement.

U.S. Pat. No. 2,673,632

Inventor: John A. Stiranka

Issued: Mar. 30, 1954

For use in operating the screw-threaded sleeve of a turnbuckle wherein said sleeve is provided intermediate its ends with a rigid toothed ratchet wheel, means for turning said sleeve through the medium of said ratchet comprising a handle bifurcated at one end and defining spaced parallel furcations, said furcations being separably bolted at ends adjacent to said handle, the opposite ends of said furcations having apertured terminal portions adapted to embrace said sleeve and to permit the handle and n members to be oscillated, a reversible double ended pawl having a bushing-equipped hub portion rockably mounted between said furcations, said pawl including an apertured ear at an intermediate point that portion of said furcations adjacent said handle being provided with a concave socket, a coil spring having one end connected with said ear, a spring positioning anchoring, and stabilizing member comprising a shank passing lengthwise through the bore of said spring and having an enlarged semi-spherical head whose convex side is removably and accommodatingly seated in said socket, the other side of said head providing a spring abutment and the adjacent coil of one end of the spring engaging said abutment, said shank extending beyond the other end of the spring and terminating short of the path of swing of the ear so as not to collide with the ear during the back and forth movements of the ear, and the cross section of said shank being substantially equal to the diameter of the bore of the spring from buckling.

U.S. Pat. No. 3,338,359

Inventor: Adam Baillie et al.

Issued: Aug. 29, 1967

In a ratchet-type load binder of a type having a double-ended pawl pivotally mounted on a load binder handle for selective engagement in either of two adjusted positions with a load binder ratchet wheel; pawl control mechanism including first socket engagement means formed in the pawl spaced from and extending parallel with the pawl pivot axis and movable with the pawl; similar second socket engagement means formed in the handle extending parallel with the first socket engagement means and the pawl pivot axis, and fixed in spaced relation with respect to said pawl pivot axis; a pair of similar pressure members, each pressure member having a shank, a boss at one shank end having a cylindrical portion extending at 90° with respect to the axis of the shank, and a shoulder formed at the intersection of the shank with the boss; a coil spring member having end portions; the pair of pressure members being assembled with the coil spring member with pressure member shanks received in opposed spaced relation within end portions of the spring and with the spring end portions seated on said pressure member shoulders; the boss of one pressure member being seated in the first socket means; and the boss of the other pressure member being seated in the second socket means.

U.S. Pat. No. 4,069,902

Inventor: Brian D. Zdeb

Issued: Jan. 24, 1978

Novel ratchet loadbinder apparatus utilizing a spring-biased single pawl member carried within a slotted cam formed on the loadbinder's handle, the pawl member being selectively and reversibly positioned in one of two operating positions formed by bearing recesses at both ends of the slotted cam, such selective placement depending upon the desired direction of movement of an associated screw-threaded turnbuckle barrel. The loadbinder's handle carries a spring member utilized to maintain the pawl member in its preselected position during indexing handle movements. During working stroke handle movements, the pawl member is forcibly interposed between the selected bearing recess on the handle and an associated ratchet gear rigidly mounted on the threaded barrel.

U.S. Pat. No. 4,130,269

Inventor: Kenneth D. Schreyer

Issued: Dec. 19, 1978

A ratchet type telescopic load binder (1) having axially and oppositely moveable first and second threaded screw members (7,8) of different diameters is disclosed. The larger diameter member (7) includes an axial cylindrical void (11) into which the smaller screw member (8) is permitted to move. Greater reach is achieved by providing the smaller member (8) with a screw thread (10) pitch and a thread (10) length which are greater than those of the larger member (7). The cylindrical void (11) of the larger member (7) extends past its operative thread (9) length to accommodate increased penetration of the smaller member (8).

U.S. Pat. No. 4,438,612

Inventor: Alain Bernard et al.

Issued: Mar. 27, 1984

Two facing walls have portions 1 and 2 connected together by a tie rod comprising a central section 4 and two end sections 5 and 6 joined to the central section by two bars 3 each with a ball head 7 at its opposite ends. The ball head in section 5 or 6 is disposed in a respective socket 8 or 33 attached to the wall portion 1 or 2. Central section 4 is essentially a turnbuckle comprising an outer tube with internal threads engaging sockets 25 for the ball heads in the central section.

U.S. Pat. No. 6,945,516

Inventor: Gary Scott

Issued: Sep. 20, 2005

A tool for binding and securing the binding of a load, said binding including a tube having left and right hand threads at opposed ends and sides and threaded shafts mated to the threads whereby turning of the tube relative to the shafts produces common insertion or extension of the shafts relative to the tube. A gear secured to the tube and a pivotal housing with handle surrounding the gear. A pawl carried by the housing and moveable into and out of engagement with the gear in either rotative direction whereby handle movement either contracts or extends the shafts simultaneously from the tube. A centered position of the pawl and a detent in said pawl engaged by a spring biased pinion that retains the pawl as desired out of engagement with the gear for free turning of the tube. The handle may be pivoted to a parallel position with the tube for convenient storage and safety, and a lock may be applied to lock the pawl in a position for contracting the shafts to prevent inadvertent release from the load binding condition.

Japan Patent Number JP5918738

Inventor: Hiroyuki Takaguchi

Issued: Oct. 24, 1984

PURPOSE: To tension and relieve a wire of the tension in a short time by providing a temporary mechanism for stopping an operating lever in which a cam and a projection of a nut are brought into contact when the operating lever is pivoted to separate the nut and cam. CONSTITUTION: When an operating lever 15 is pivoted in such a direction that it is raised to the upper surface of a block body 4, the tip of a pair of cams 16 is separated from the top surface of a nut 12, and a projection 19 of the nut 12 engages a bearing 17 of the cam 16. Then the nut 12 is drawn upward to release the engagement of the nut 12 and a threaded rod 7 to allow tensioning a wire which is connected to a connector 8 at an end of the threaded rod 7. When the lever 15 is moved downward to engage the second engagement part 23 with a bending area 21 of a leaf spring 20, the nut 12 is engaged and held with the threaded rod 7. As threads 11 have a vertical planar face, the threaded rod 7 is free to move toward the inside of a frame body 1, allowing tensioning the wire. By this, tensioning and relieving the wire of tension can be done in a short time by operating the lever 15.

Japan Patent Number JP2271102

Inventor: Hirobum Hatama et al.

Issued: Nov. 6, 1990

PURPOSE: To improve the ease of tightening work in a limited space by installing a worm on the shaft of a ratchet wheel driven by an operating lever which rotates inside a plane including the shaft center of a casing rotatably mounted on a main body internally threaded tube having a worm gear at its center. CONSTITUTION: A worm gear 6 is firmly fixed in the middle of a main body internally threaded tube 1 having on its ends the right and left female screw parts 4, 5 which are threadedly engaged with the right and left screw joints 2, 3, and a casing 10 formed with collars 11 abutting on both sides thereof and a short tube 12 is rotatably installed on the main body internally threaded tube 1. The bearing casing 14 of a shaft 13 equipped with a worm 15 and a ratchet wheel 16 is firmly fixed on the casing 10. Moreover, an operating lever 18 which rotates inside a plane including a latch pawl 17 and the shaft center of the internally threaded main body tube 1 is installed on the outer periphery of the ratchet wheel 16, so that works in a limited space can be executed quickly, easily and stably.

Japan Patent Number JP5318330

Inventor: Kosui Omi

Issued: Dec. 3, 1993

PURPOSE: To rotate a turnbuckle easily and also attach and detach it easily. CONSTITUTION: Two guide plates 7 with an opening 7a are fixed on both sides of a handle 6 with screws to form a guide section 2. The inside of the guide section 2 has a space enough to fit loosely a turnbuckle. Two roughly triangular engagement claws 3 and 4 are installed rotatably in the space of the guide section 2, and pressed inward by a spring 10. Also an opening lever 5 is installed rotatably at the opening 7a of the guide section 2. When the turnbuckle is made in contact with the engagement claws 3 and 4 from the engaged surface sides 3b and 4b, the turnbuckle is engaged with the engagement claws 3 and 4 and, when it is made in contact with them from the non-engaged surface sides 3c and 4c sides, the claws 3 and 4 are rotated and the turnbuckle are not engaged. Also the turnbuckle can be attached and detached easily from the opening 7a.

European Patent Application Number EP1435310

Inventor: Juergen Freigeber

Published: Jul. 7, 2004

The turnbuckle, to lash down vehicle loads, has a tube (1) with inner threads at the ends with opposing pitches. Threaded spindles (2,3) are screwed into the ends of the tube, with eyelets (2.1,3.1) at their free ends to take the lashings. A ratchet bar (4) rotates the tube to move the spindles in relation to each other. A sliding locking sleeve (5) is on the tube, keyed against rotation in relation to the tube, and with a locking unit (5.1) at one end to work with a lashing eyelet (2.1). When the load has been lashed into place, the turnbuckle tube is blocked against rotation in relation to the spindle (2).

While these turnbuckles may be suitable for the purposes for which they were designed, they would not be as suitable for the purposes of the present invention, as hereinafter described.

SUMMARY OF THE PRESENT INVENTION

A primary object of the present invention is to provide a turnbuckle for expanding and contracting attached workpieces relative to each other.

Another object of the present invention is to provide a turnbuckle having releasable anchor plates fastened thereto.

Yet another object of the present invention is to provide anchor plates that are rotatively mounted to the turnbuckle portion of the device.

Still yet another object of the present invention is to provide a turnbuckle wherein said anchor plates each have a blade extending from the base.

An additional object of the present invention is to provide said anchor plate blades having a substantially triangular shape.

A further object of the present invention is to provide said anchor plates with a plurality of anchor plate blades that can be driven into a workpiece to expand or contract the relative distance between the turnbuckle engaged workpieces.

A yet further object of the present invention is to provide the anchor plate blades with an acute angle between the anchor plate and the blade tip so that the blade tip forms initial engagement with a workpiece when pushing one workpiece away from another workpiece.

A still yet further object of the present invention is to provide a turnbuckle having anchorable plates whereby each of the bladed anchor plates can be positioned with the blade tips facing towards each other, away from each other or one towards the other while the other faces away from the other.

Another object of the present invention is to provide the anchor plates with a plurality of apertures whereby said plates can additional use fasteners to attach said plates to one or more workpieces as an additional anchoring element to extend or retract the distance between the workpieces relative to one another using the turnbuckle portion of the device.

Yet another object of the present invention is to provide a turnbuckle wherein said anchor plates can be reversed to perform a seperator function between attached workpieces.

Still yet another object of the present invention is to provide a turnbuckle wherein said anchor plates can be flipped whereby one or both of the blades are upwardly depending.

Additional objects of the present invention will appear as the description proceeds.

The present invention overcomes the shortcomings of the prior art by providing a turnbuckle having pivoting releasable anchors on opposing ends that when attached to different articles provides for moving one or both of the attached article toward or away from the other. The turnbuckle anchors comprise a plate incorporating housing for releasably receiving a turnbuckle eyelet and a blade extending from the base having a substantially triangular shape. The blade when driven into an article forms an anchor at one end with the other blade driven into or abutting another article whereby said other article can be moved toward or away from the first anchored article. The anchor plates are realignable so that the blades having a somewhat flat edge forming an acute angle with said anchor plate can be respectively faced toward or away from the other and flipped whereby one blade is facing up while the other faces down.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 14 is an orthographic view of the present invention in use.

DESCRIPTION OF THE REFERENCED NUMERALS

Figure 1:
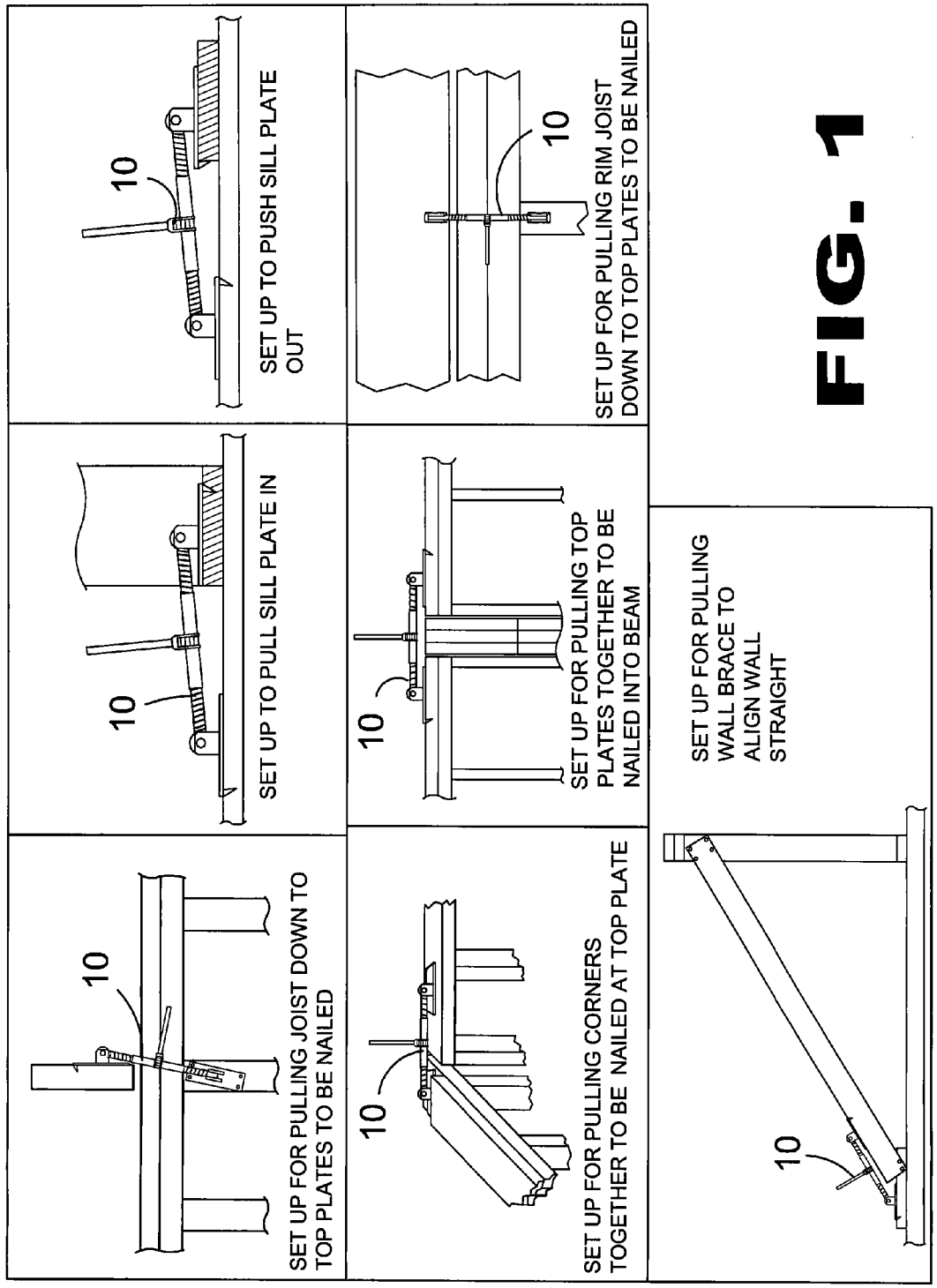
FIG. 1 is an illustrative chart of the uses of the present invention.

Turning now descriptively to the drawings, in which similar reference characters denote similar elements throughout the several views, the figures illustrate the Anchoring Turnbuckle for Expanding or Contracting the Distance Between Workpieces. With regard to the reference numerals used, the following numbering is used throughout the various drawing figures.

10 Anchoring Turnbuckle for Expanding or Contracting the Distance Between Workpieces
12 turnbuckle
13 threads of 12
14 anchor plate
16 base plate of 14
18 first surface of 16
20 bolt plate
22 aperture of 20
24 second surface of 16
26 anchor blade
28 interior edge of 16
30 eyelet
32 bolt
33 nut
34 first eyelet
36 right handed threaded rod
38 second eyelet
40 left handed threaded rod
42 first anchor
44 second anchor
46 reversible ratchet mechanism
48 handle
50 joist
52 wall stud
54 crown gap
56 top plate
58 nailing recess
60 plywood subfloor
62 sill plate
64 beam
66 wall frame
68 brace
70 nailer block
72 nail

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative chart of the uses of the present invention 10. The present invention is a versatile tool that can be used in the wood framing construction business to align framing lumber by pushing or pulling the lumber to a desired position before fastening.

Figure 2:
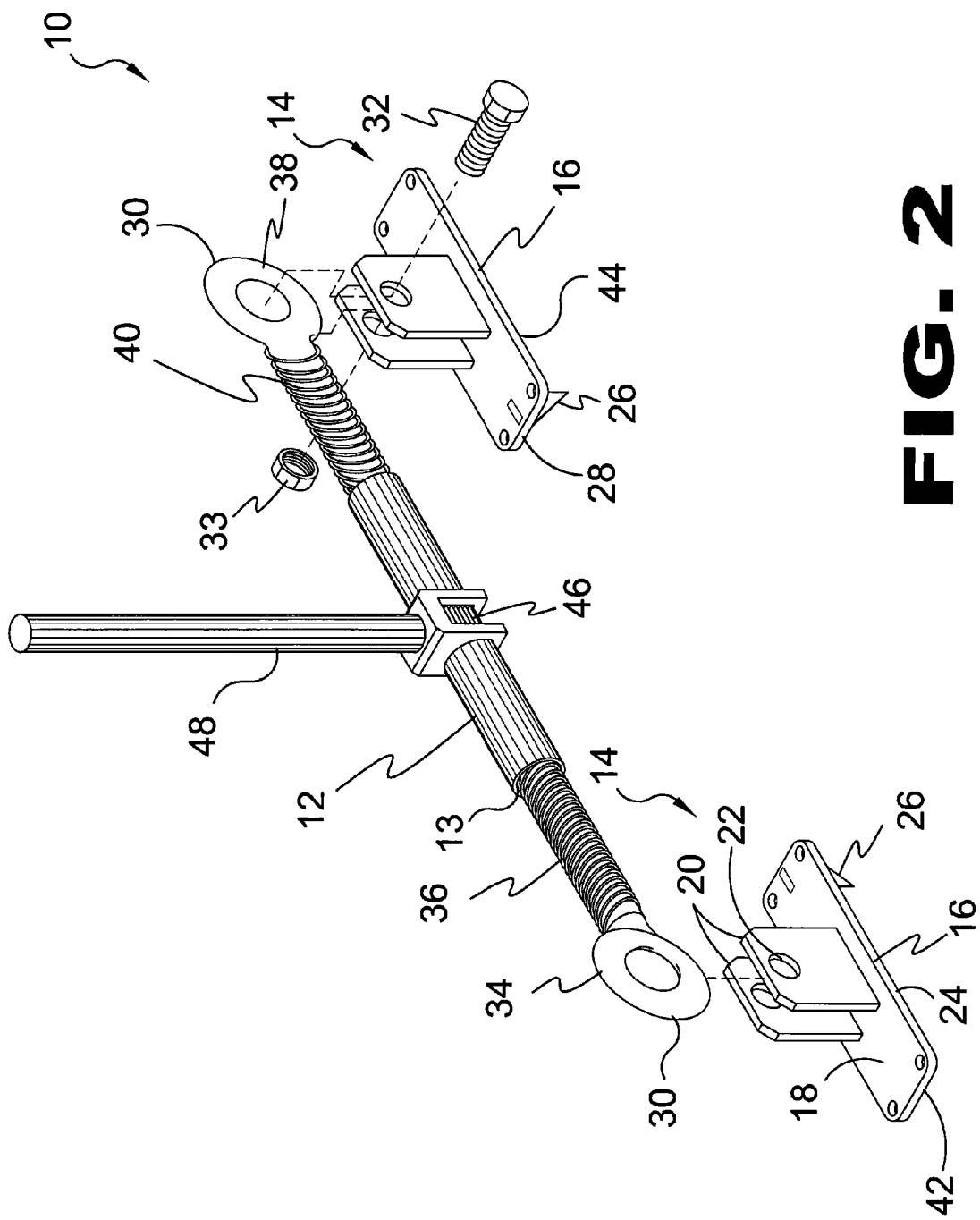
FIG. 2 is a perspective of the present invention.

FIG. 2 is a perspective of the present invention 10. The present invention is a threaded 13 tie rod turnbuckle 12 having a pair of pivoting releasable anchors 14 on opposing ends that when attached to different articles provides for moving one or both of the attached articles towards or away from each other. The turnbuckle anchors 14 comprise a base plate 16 having a first surface 18 with a pair of spaced apart bolt plates 20 projecting therefrom with apertures 22 for receiving a bolt 32 and nut 33 and a second opposing surface 24 with a blade 26 extending from the interior edge 28 thereof. The bolt plates 20 are positioned to releasably receive a turnbuckle eyelet 30 and the blade extending from the base plate 16 has a triangular shape so that the blade 26 can be driven into an article forming an anchor at one end with the other blade 26 driven into or abutting another article whereby each can be moved toward or away from the other. The anchor base plates 16 are realignable so that the blades 26 can be respectively faced toward or away from each other or flipped whereby one blade 26 is facing up while the other faces down. The first eyelet 34 has a right hand threaded rod 36 extending therefrom and is associated with the first anchor 42 and the second eyelet 38 has a left handed treaded rod 40 and associated with the second anchor 44 wherein both rods are threaded into the turnbuckle 12. A reversible ratchet mechanism 46 has a handle 48 used to rotate the turnbuckle 12 accordingly for drawing the anchors 14 and their associated workpieces together or apart as needed.

Figure 3:
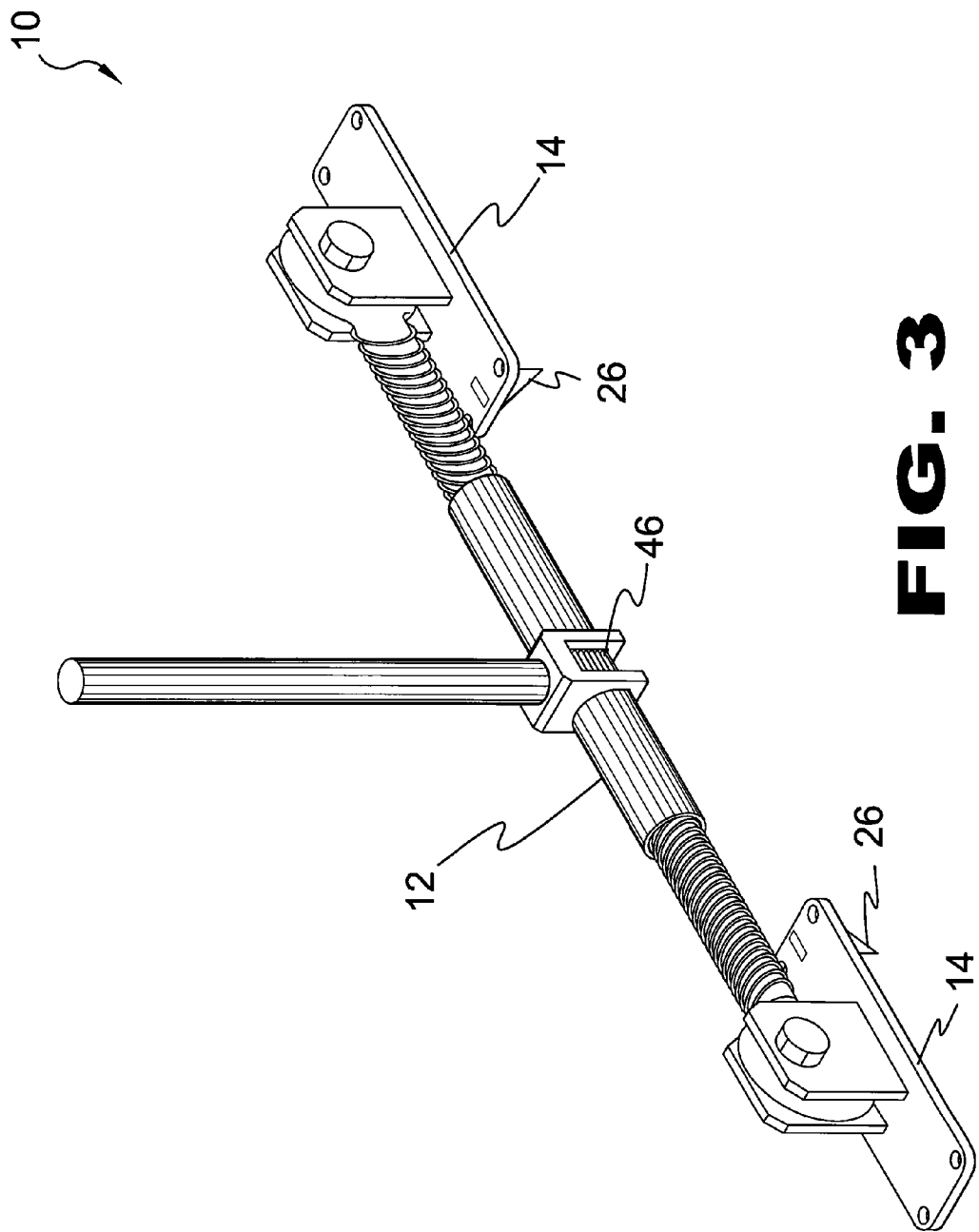
FIG. 3 is an assembled view of the present invention.

FIG. 3 is an assembled view of the present invention 10. As illustrated, the anchorable turnbuckle 12 has an anchor 14 on each end with a blade element 26 extending from the bottom that may be driven into a respective workpiece whereupon the ratcheting mechanism 46 can be used to draw the articles together or spread them apart.

Figure 4:
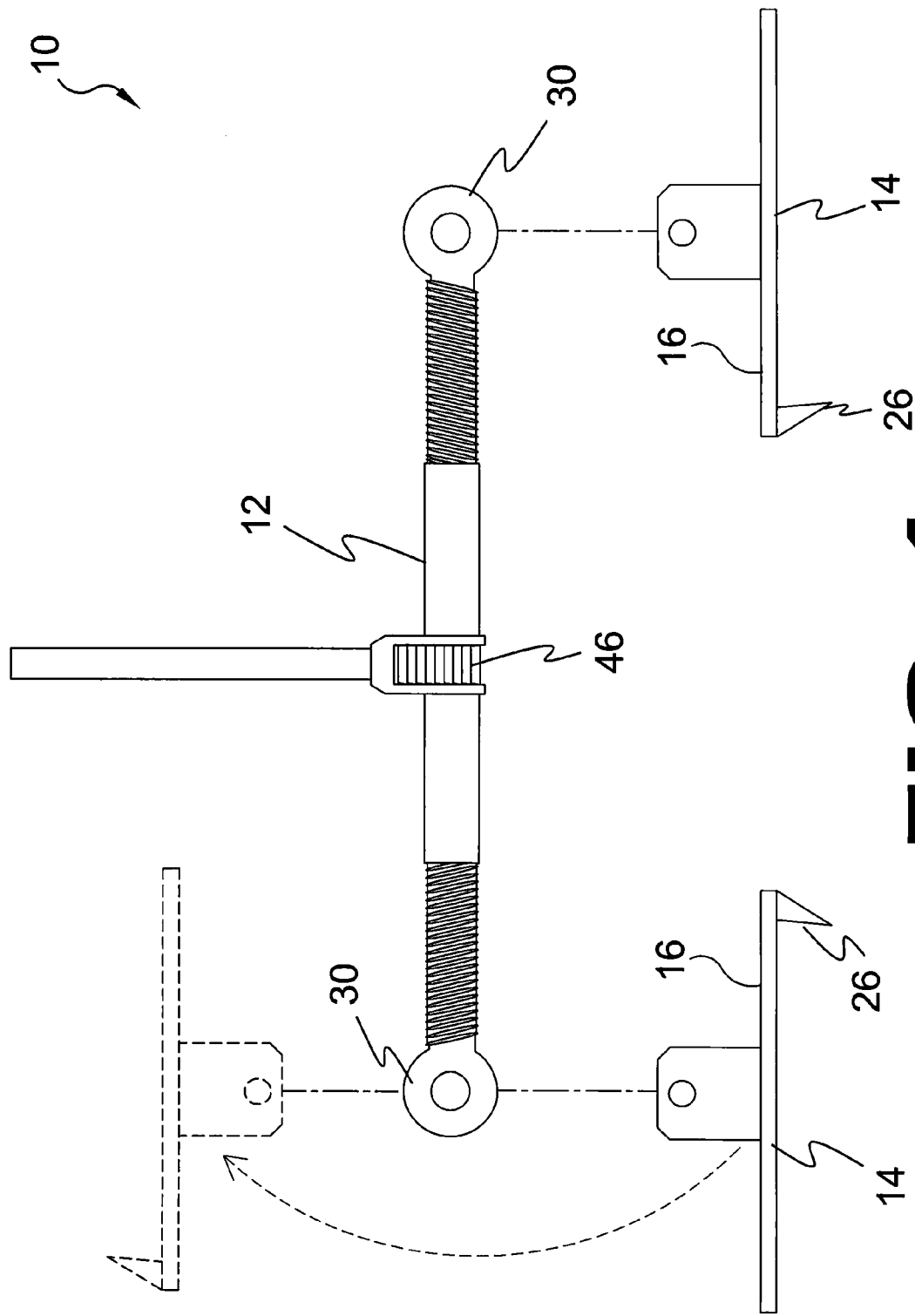
FIG. 4 is a front view of the present invention.

FIG. 4 is a front view of the present invention 10. The present invention 10 is a turnbuckle 12 having pivoting releasable anchors 14 on opposing ends that when embedded into different articles provides for moving one or both of the attached article toward or away from the other with a reversible ratchet mechanism 46. The turnbuckle anchors 14 comprise a base plate 16 incorporating housing for releasably receiving a turnbuckle eyelet 30 and a blade 26 extending from the base 16 having a triangular shape. The blade 26 when driven into an article forms an anchor at one end with the other blade 26 driven into or abutting another article whereby each can be moved toward or away from each other. The anchors 14 are realignable so that the blades 26 having a somewhat flat edge can be respectively faced toward or away from the other and also flipped whereby one blade 26 is facing up while the other faces down.

Figure 5:
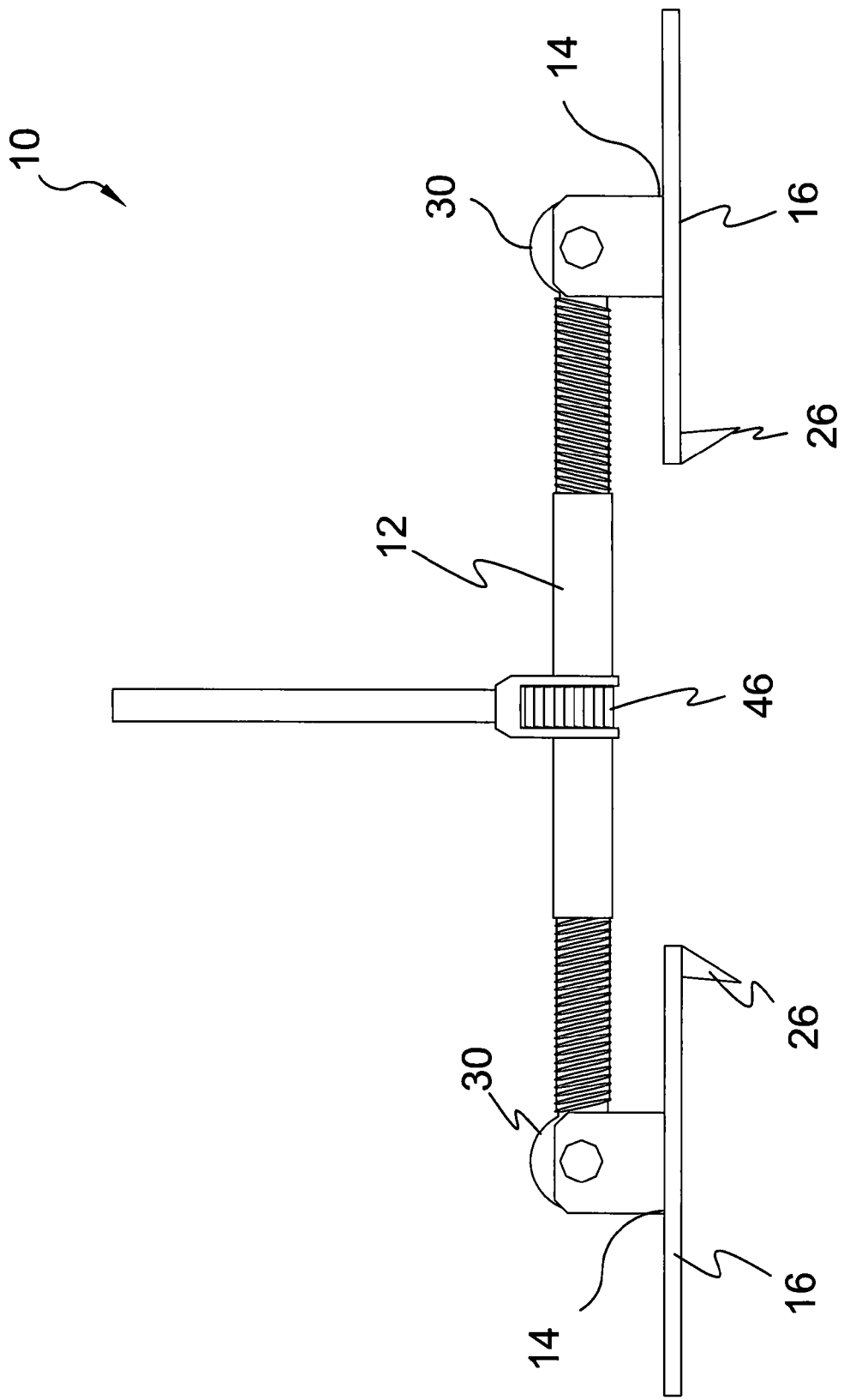
FIG. 5 is a front assembled view of the present invention.

FIG. 5 is a front assembled view of the present invention 10. The present invention 10 is a turnbuckle 12 having pivoting releasable anchors 14 on opposing ends that when embedded into different articles provides for moving one or both of the attached article toward or away from the other with a reversible ratchet mechanism 46. The turnbuckle anchors 14 comprise a base plate 16 incorporating housing for releasably receiving a turnbuckle eyelet 30 and a blade 26 extending from the base 16 having a triangular shape. The blade 26 when driven into an article forms an anchor at one end with the other blade 26 driven into or abutting another article whereby each can be moved toward or away from each other. The anchors 14 are realignable so that the blades 26 having a somewhat flat edge can be respectively faced toward or away from the other and also flipped whereby one blade 26 is facing up while the other faces down.

Figure 6:
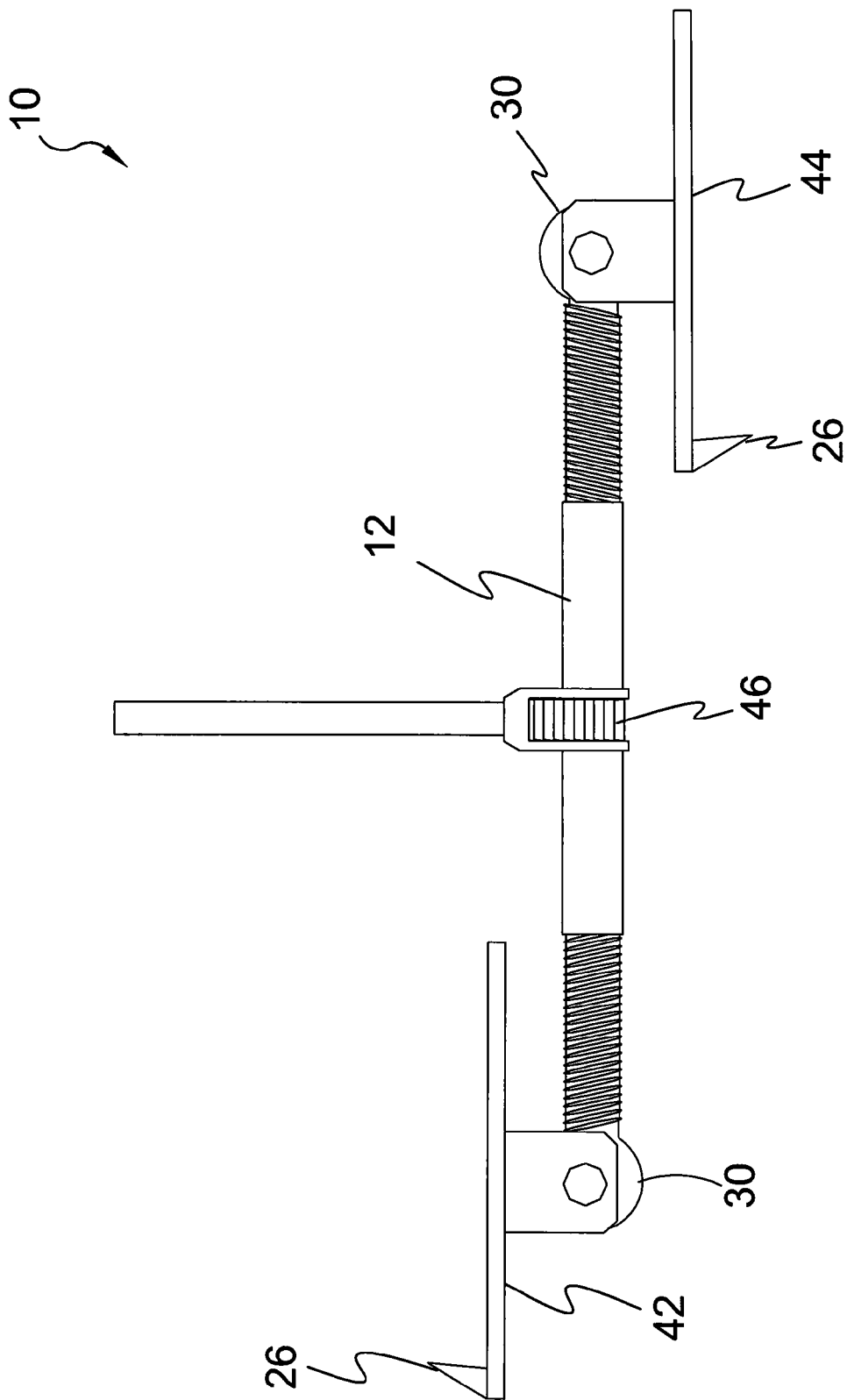
FIG. 6 is a front view of anchoring turnbuckle for expanding or contracting the distance between workpieces.

FIG. 6 is a front view of the present invention 10. As illustrated, the anchoring turnbuckle for expanding or contracting workpieces has a first anchor 42 and a second anchor 44 with each being releasably fastened to eyelets 30 on each end of a turnbuckle 12 with a reversible ratchet 46 whereby one or the other can be flipped so that the blades 26 are on opposing sides.

Figure 7:
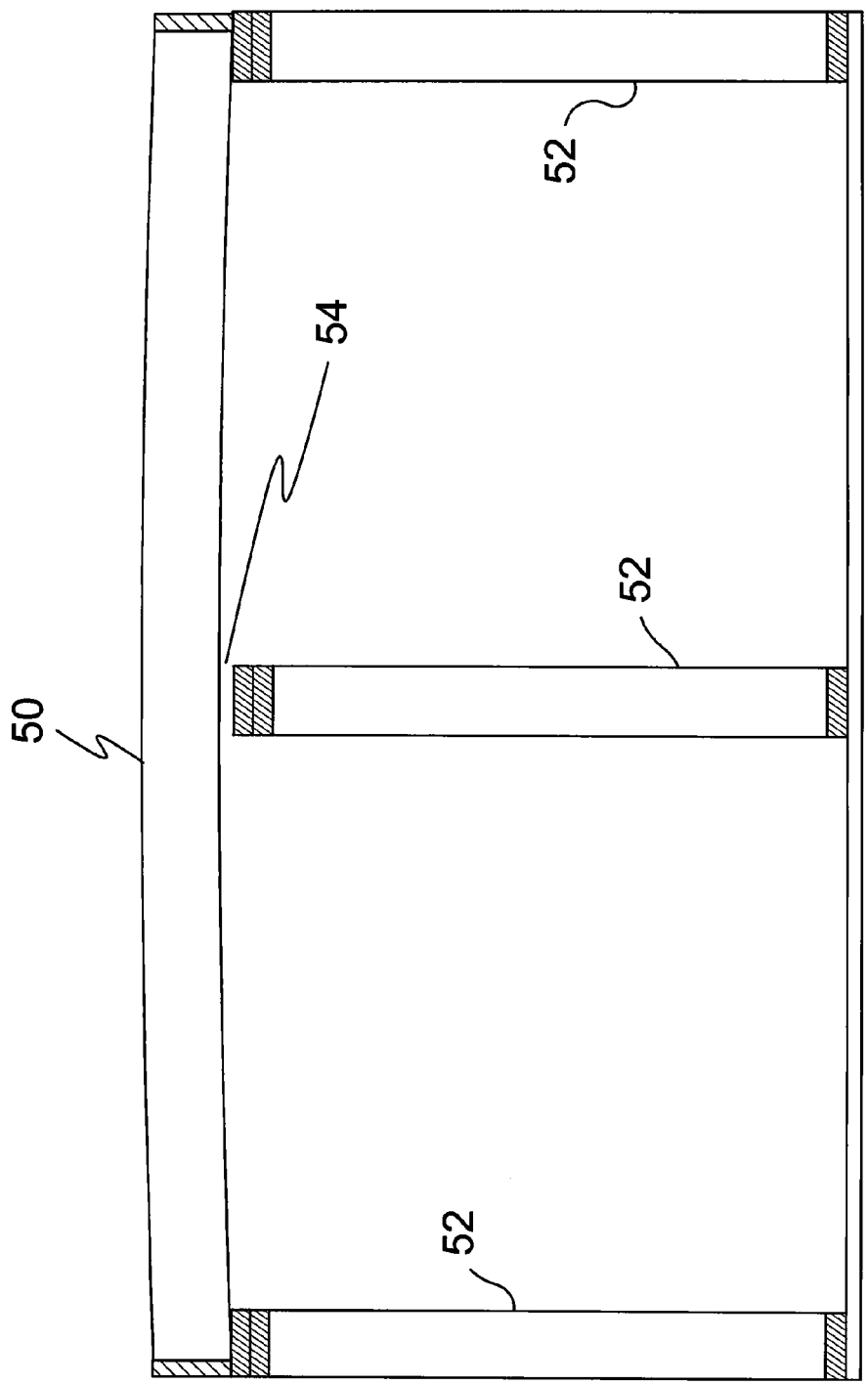
FIG. 7 is an illustrative view of the usage of the present invention.

FIG. 7 is an illustrative view of the need of the present invention. Residential code requires that all ceiling or floor joists 50 must be nailed to any walls 52 they lap. Therefore the gap 54 resulting from the "crown" in the lumber should be addressed prior to nailing.

Figure 8:
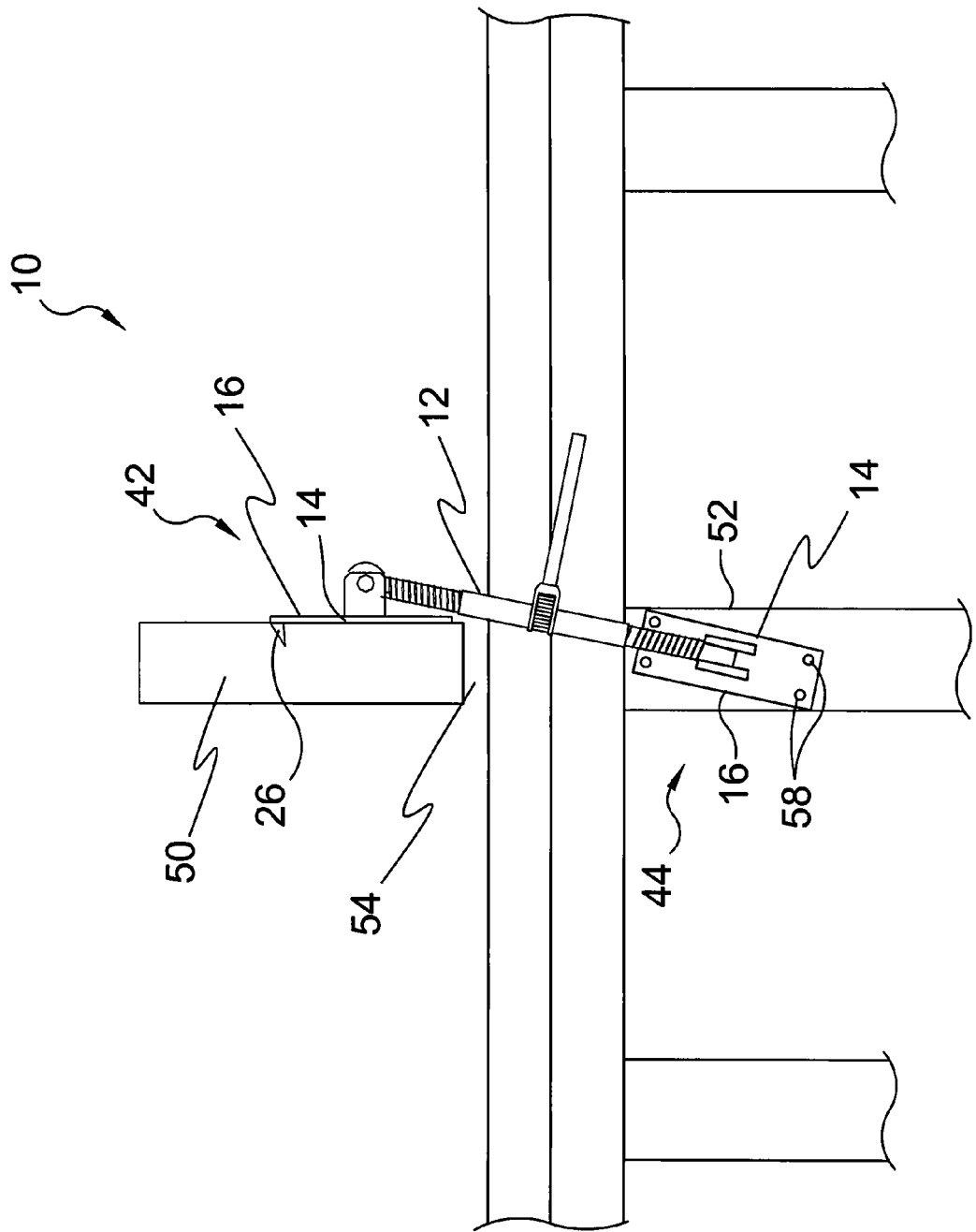
FIG. 8 is a front view of anchoring turnbuckle for expanding or contracting the distance between workpieces.

FIG. 8 is a front view of anchoring turnbuckle 10 for expanding or contracting the distance between workpieces. As illustrated, the present invention 10 includes a pair of anchor plates 14 releasably fastened to each end of a turnbuckle 12. The first anchor 42 is attached to the joist 50 while the second anchor 44 is attached to a stud 52 whereby the joist 50 can be moved toward the top plate 56 at a desired location to close the gap 54 therebetween. Nailing recesses 58 are disposed in the base plates 16 of the anchors 14 to enable the user provide a more secure engagement with its respective workpiece then just embedding the blades 26 therein by nailing it thereto. The anchors 14 are rotatable and pivotable to provide versatility for various applications.

Figure 9:
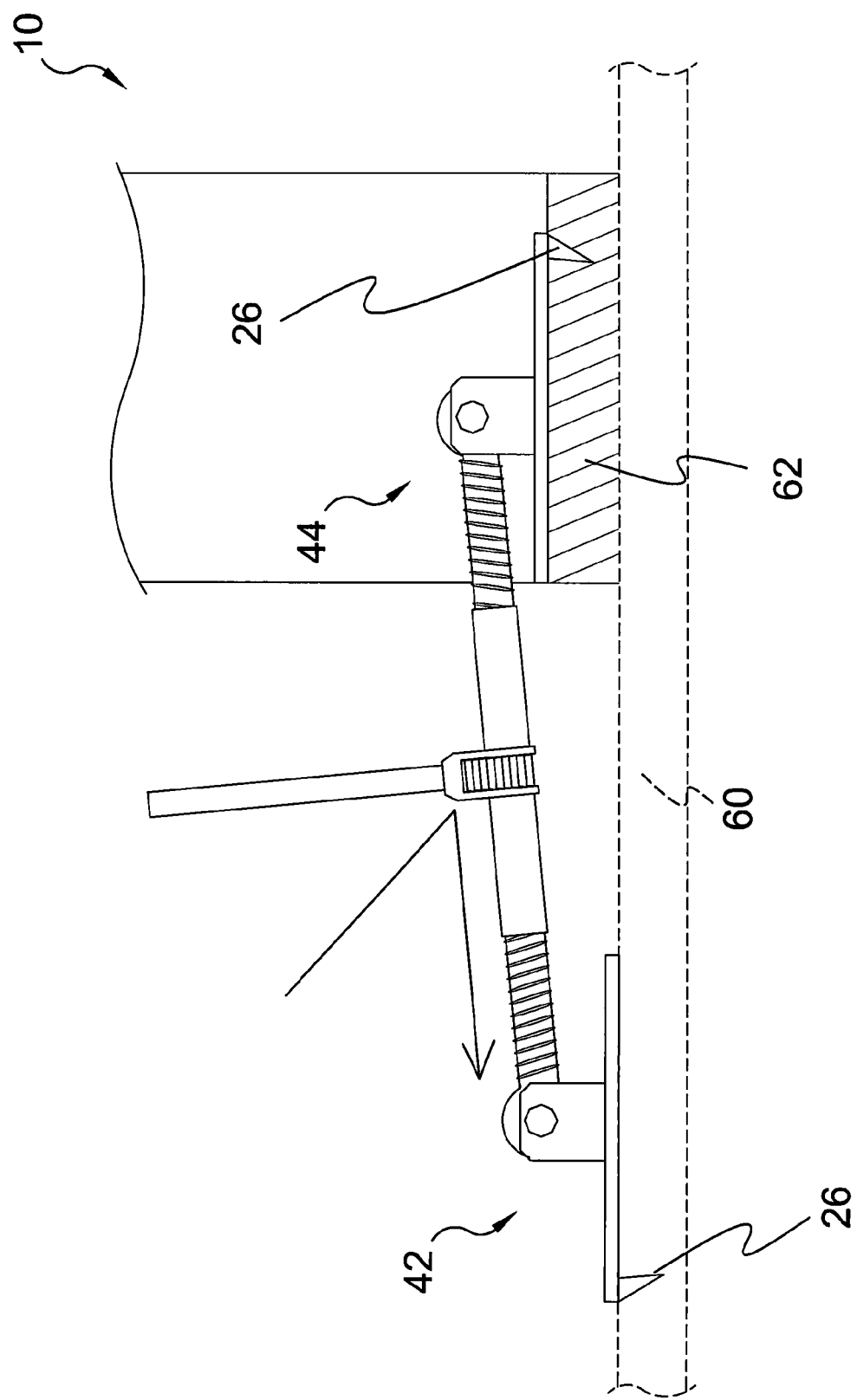
FIG. 9 is a front view of anchoring turnbuckle for expanding or contracting the distance between workpieces.

FIG. 9 is a front view of anchoring turnbuckle 10 for expanding or contracting the distance between workpieces set up to pull a sill plate 62 in. The blade 26 of the first anchor 42 is hammered and embedded into the plywood subfloor 60 while the second anchor 44 is attached to a sill plate 62 whereby the sill plate 62 can be moved toward the anchored floor plate at a desired location.

Figure 10:
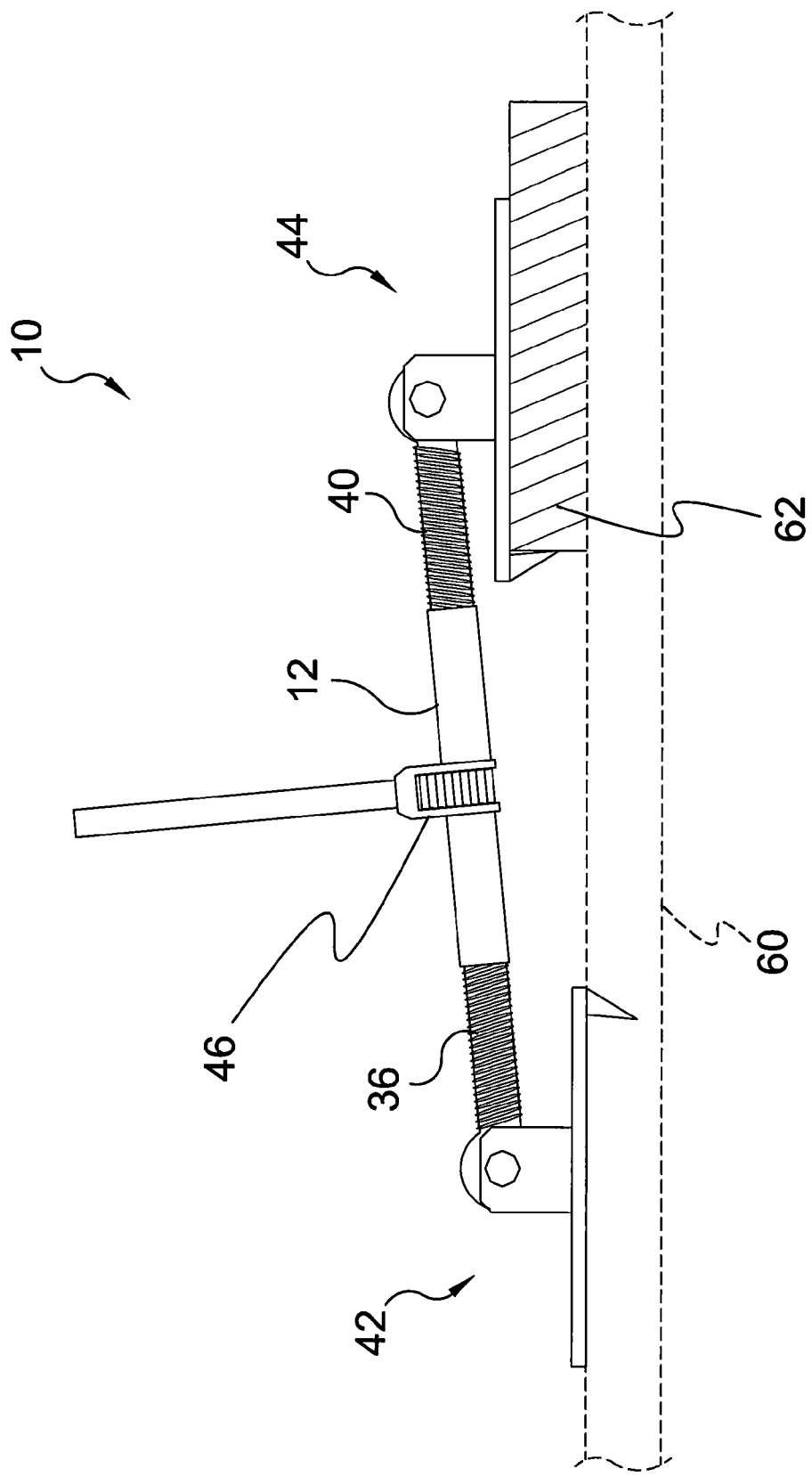
FIG. 10 is a front view of anchoring turnbuckle for expanding or contracting the distance between workpieces.

FIG. 10 is a front view of anchoring turnbuckle 10 for expanding or contracting the distance between workpieces set up to push a sill plate 62 out. The first anchor 42 is attached to the floor 60 while the second 44 is attached to a sill plate 62 whereby the sill plate 62 can moved toward the first anchor 42 due to the reverse threading of the threaded rods 36, 40 and reversing the rotation of the ratchet 46 and the turnbuckle 12.

Figure 11:
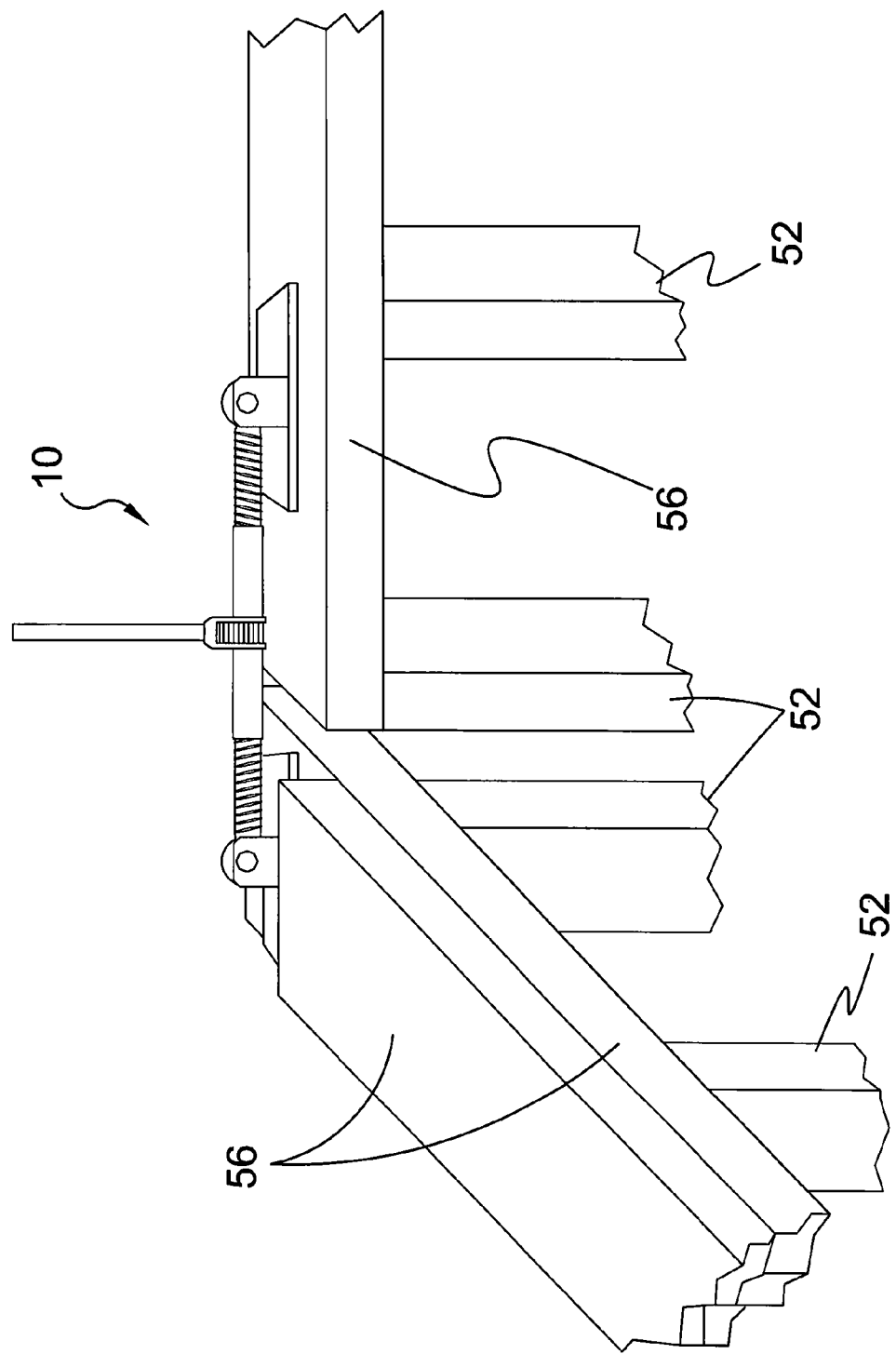
FIG. 11 is an orthographic view of the present invention in use.

FIG. 11 is an orthographic view of the present invention 10 in use. Shown is the present invention 10 set up to pull two top plates 56 and their associated wall studs 52 together at a corner.

Figure 12:
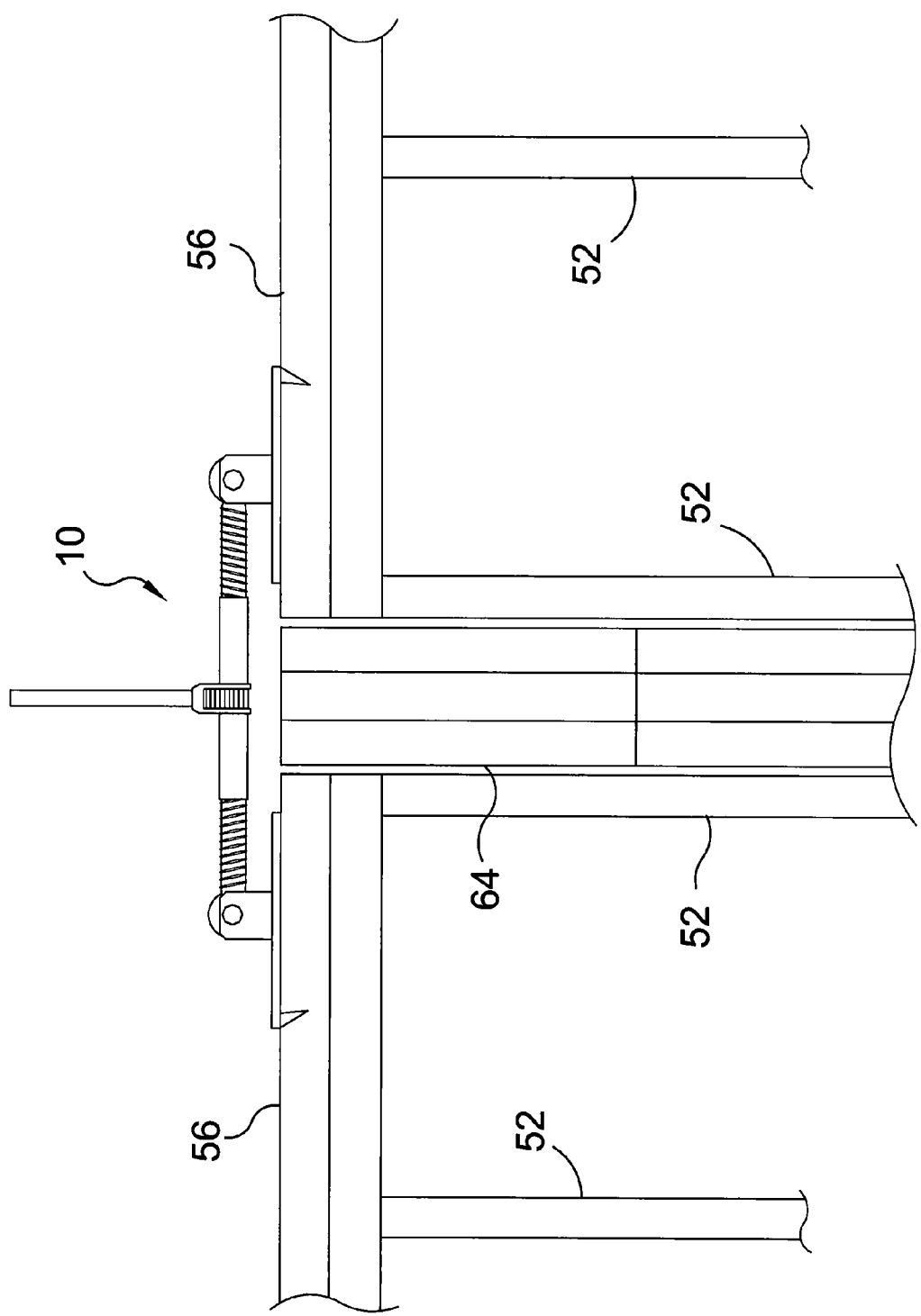
FIG. 12 is an orthographic view of the present invention in use.

FIG. 12 is an orthographic view of the present invention 10 in use. Shown is the present invention 10 set up to pull two top plates 56 and their associated wall studs 52 together towards a beam 64.

Figure 13:
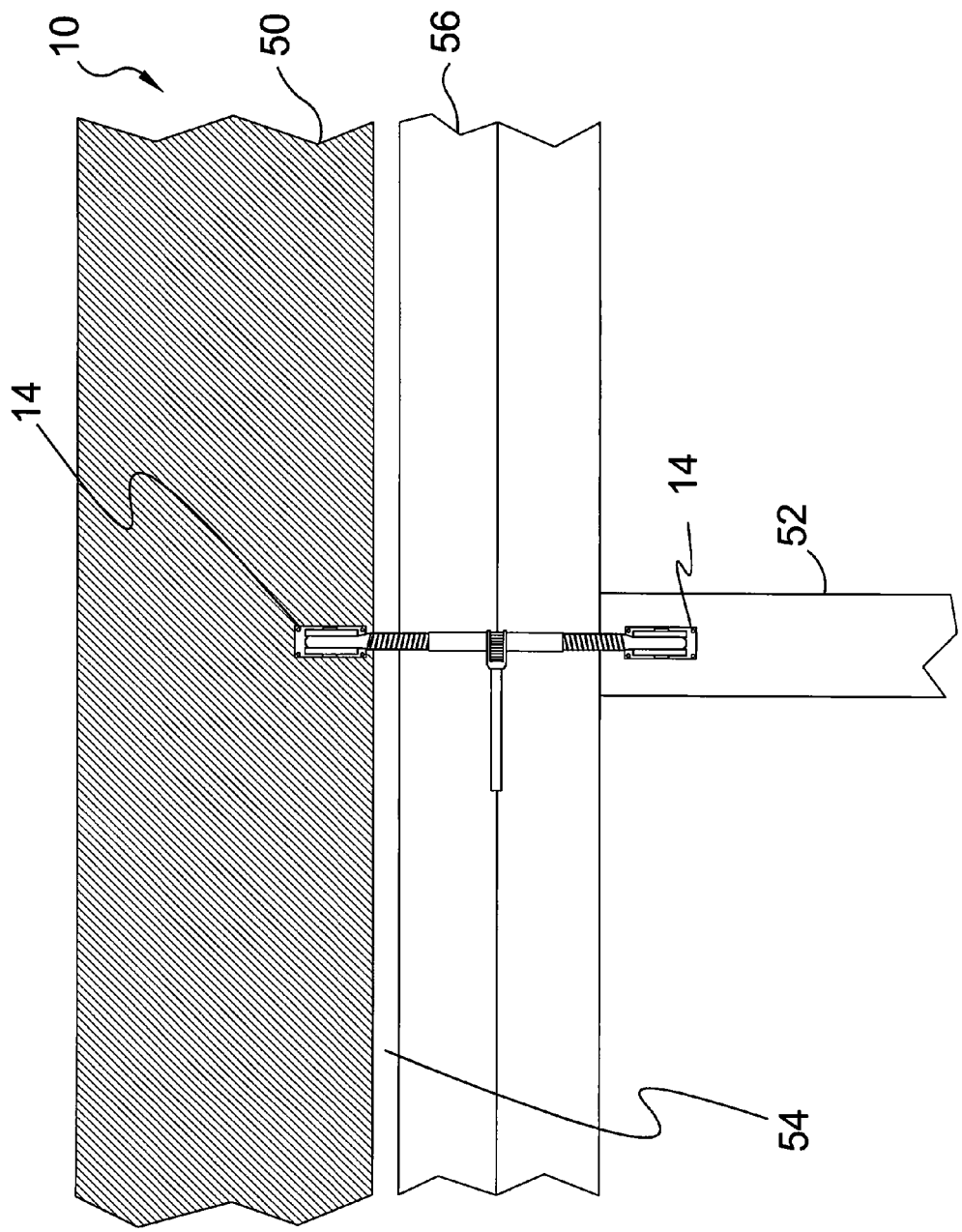
FIG. 13 is an orthographic view of the present invention in use.

FIG. 13 is an orthographic view of the present invention 10 in use and set up for pulling a rim joist 50 towards the top plates 56 to be nailed. The anchors 14 are embedded in a wall stud 52 and the rim joist 50 with a gap to be closed between the joist 50 and the top plates 56 disposed therebetween.

FIG. 14 is an orthographic view of the present invention 10 in use to align a wall frame 66 to be braced 68. One end of the brace 68 is nailed to an upper portion of a wall stud 52 and the other is proximal to a nailer block 70 nailed to the floor 60. One anchor is 14 embedded in the block 70 and the other is engaged with the brace 68.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An anchoring turnbuckle for expanding or contracting the distance between workpieces comprising:
   a) a cylindrical turnbuckle having interior threads;
   b) a ratchet mechanism associated with said turnbuckle;
   c) a first threaded rod having right handed threads disposed thereon and an eyelet on the opposing end thereof;
   d) a second threaded rod having left handed threads disposed thereon and an eyelet on the opposing end thereof;
   e) an anchor plate pivotally disposed on the eyelet of each said rod to be embedded into opposing workpieces to expand or contract the distance therebetween;
   f) said threaded rods are threaded into said turnbuckle wherein the rotation of said turnbuckle will expand or contract the distance between said eyelets and their associated anchors accordingly; and
   g) said anchors comprise:
      i) a base plate having a first surface and a bottom surface;
      ii) means for pivotally and releasably securing said anchor to said eyelet disposed on said first surface of said base plate; and
      iii) a blade projecting from the edge of said second surface of said base plate.

2. The anchoring turnbuckle for expanding or contracting the distance between workpieces recited in claim 1, wherein said anchor securing means is a pair of spaced apart bolt plates projecting from a medial portion of said base plate with each having a corresponding aperture for receiving a bolt therethrough.

3. The anchoring turnbuckle for expanding or contracting the distance between workpieces recited in claim 2, wherein said bolt plates and apertures are dimensioned to receive its respective eyelet therebetween with a fastener element extending therethrough without impinging the pivotability thereof.

4. The anchoring turnbuckle for expanding or contracting the distance between workpieces recited in claim 3, wherein said fastener element is a bolt and nut assembly that enables to quickly and easily install and release said anchor to reverse the relation of said anchor with regard to its respective eyelet and the opposing anchor as determined by the action required.

5. The anchoring turnbuckle for expanding or contracting the distance between workpieces recited in claim 4, wherein said blade is of a substantially triangular configuration to encourage embedding into said workpiece.

6. The anchoring turnbuckle for expanding or contracting the distance between workpieces recited in claim 5, wherein said blades project at an acute angle between said base plate and a blade tip so that the blade tip forms initial engagement with said workpiece when pushing one workpiece away from another workpiece.

7. The anchoring turnbuckle for expanding or contracting the distance between workpieces recited in claim 6, wherein said second anchor is removed, reversed and reinstalled with said blade disposed medially with respect to said turnbuckle when expansion is required.

8. The anchoring turnbuckle for expanding or contracting the distance between workpieces recited in claim 7, wherein said first anchor is embedded into its respective workpiece and said base plate is seated upon its workpiece to be pushed with said blade contacting the side thereof and becoming embedded therein upon initiation of expansion due the rotation of said turnbuckle.

9. The anchoring turnbuckle for expanding or contracting the distance between workpieces recited in claim 1, wherein said ratchet mechanism further includes a handle to provide leverage during the rotation thereof.

10. The anchoring turnbuckle for expanding or contracting the distance between workpieces recited in claim 1, wherein said anchors are installed with said blades disposed in a similar orientation at the distal ends thereof when contraction of said workpiece distance is desired.

11. The anchoring turnbuckle for expanding or contracting the distance between workpieces recited in claim 10, wherein said blades are embedded into their respective workpieces by hammering a portion of said first surface of said base plate immediately above said blade.

12. The anchoring turnbuckle for expanding or contracting the distance between workpieces recited in claim 11, wherein the user rotates said turnbuckle to draw said workpieces to the desired point of contraction.

13. The anchoring turnbuckle for expanding or contracting the distance between workpieces recited in claim 12, wherein said anchors are removed from their respective workpieces upon completion of the task.

* * * * *